US008300122B2

(12) United States Patent  
Suzuki

(10) Patent No.: US 8,300,122 B2  
(45) Date of Patent: Oct. 30, 2012

(54) SOLID-STATE IMAGING DEVICE, CAMERA SYSTEM, AND SIGNAL READING METHOD

(75) Inventor: Shunsuke Suzuki, Westlake Village, CA (US)

(73) Assignee: Olympus Corporation, Tokyo (JP)

( * ) Notice: Subject to any disclaimer, the term of this patent is extended or adjusted under 35 U.S.C. 154(b) by 285 days.

(21) Appl. No.: 12/756,502

(22) Filed: Apr. 8, 2010

(65) Prior Publication Data

US 2010/0259659 A1 Oct. 14, 2010

(30) Foreign Application Priority Data

Apr. 10, 2009 (JP) ................. 2009-095916

(51) Int. Cl.
 *H04N 9/64* (2006.01)
(52) U.S. Cl. .......... 348/243; 348/294; 348/321
(58) Field of Classification Search ........... 348/243, 348/245, 257, 294, 296
See application file for complete search history.

(56) References Cited

U.S. PATENT DOCUMENTS

| | | | | |
|---|---|---|---|---|
| 7,317,480 B1 * | 1/2008 | Cho et al. | ...... | 348/243 |
| 7,394,491 B2 * | 7/2008 | Bae et al. | ...... | 348/241 |
| 7,456,879 B2 * | 11/2008 | Lim et al. | ...... | 348/243 |
| 8,081,229 B2 * | 12/2011 | Ohta | ...... | 348/222.1 |
| 2009/0073289 A1 * | 3/2009 | Xu et al. | ...... | 348/243 |

FOREIGN PATENT DOCUMENTS

| | | |
|---|---|---|
| JP | 2005-065184 A | 3/2005 |
| JP | 2006-262070 A | 9/2006 |

* cited by examiner

*Primary Examiner* — Hung Lam
(74) *Attorney, Agent, or Firm* — Westerman, Hattori, Daniels & Adrian, LLP

(57) ABSTRACT

A solid-state imaging device comprises a pixel unit, an exposure control unit, a first read-out path, and a second read-out path. In the pixel unit, a plurality of photoelectric conversion devices, in which the amount of accumulated electric charges changes in accordance with incident light, are disposed two-dimensionally. The exposure control unit controls the pixel unit such that the start and end of accumulation of electric charges are performed at the same time in the photoelectric conversion devices which belong to a plurality of rows included in the pixel unit. The first read-out path reads out captured image signals of the photoelectric conversion devices in units of one row during a unit read-out period. The second read-out path reads out reset signals of the photoelectric conversion devices which belong to the same row as the row in which the captured image signals are read out during the unit read-out period.

5 Claims, 13 Drawing Sheets

SOLID-STATE IMAGING DEVICE, CAMERA SYSTEM, AND SIGNAL READING METHOD

BACKGROUND OF THE INVENTION

1. Field of the Invention

The present invention relates to a solid-state imaging device, a camera system, and a signal reading method.

Priority is claimed on Japanese Patent Application No. 2009-095916, filed Apr. 10, 2009, the content of which is incorporated herein by reference.

2. Description of Related Art

Generally, as solid-state imaging devices, MOS-type solid-state imaging devices that use pixels having an amplified reading function are known. FIG. 11 shows the pixel configuration of the MOS-type solid-state imaging device. A pixel 100 shown in FIG. 11 includes a photodiode 101, a transfer transistor 102, an electric charge maintaining unit (FD: floating diffusion) 103, a floating diffusion reset transistor 104, an amplifier transistor 105, a selection transistor 106, and a photodiode reset transistor 107. In addition, a pixel power source line 110, a floating diffusion reset line 111, a transmission line 112, a selection line 113, a vertical signal line 114, and a photodiode reset line 115 are shared by a plurality of pixels.

The photodiode 101 is a photoelectric conversion device in which the amount of accumulated electric charges changes in accordance with incident light. The transfer transistor 102 is a transistor that is used for transferring signal electric charges generated in the photodiode 101 to the electric charge maintaining unit 103. The electric charge maintaining unit 103 has an electric charge maintaining function for maintaining the electric charges transferred from the photodiode 101. The floating diffusion reset transistor 104 is a transistor that is used for resetting the electric charge maintaining unit 103. The amplifier transistor 105 is a transistor used for amplifying and reading out the voltage level of the electric charge maintaining unit 103. The selection transistor 106 is a transistor that is used for transferring the output of the amplifier transistor 105 to the vertical signal line 114 by selecting a pixel. The photodiode reset transistor 107 is a transistor that is used for resetting the photodiode 101. Here, the above-described components other than the photodiode 101 are light-shielded.

The pixel power source line 110 is a wiring used for applying a power source voltage VDD. The pixel power source line 110 is electrically connected to the drain side of the floating diffusion reset transistor 104, the drain side of the amplifier transistor 105, and the drain side of the photodiode reset transistor 107. The floating diffusion reset line 111 is a wiring for applying a floating diffusion reset pulse φRMi that is used for resetting the electric charge maintaining units 103 of one row. The floating diffusion reset line 111 is connected to the gates of the floating diffusion reset transistors 104 of one row.

The transmission line 112 is a wiring to which a row transmission pulse φTRi used for transferring signal electric charges of pixels of one row to the electric charge maintaining units 103 of the pixels is applied. The transmission line 112 is electrically connected to the gates of the transfer transistors 102 of the pixels of one row. The selection line 113 is a wiring to which a row selection pulse φSEi used for selecting pixels of one row is applied. The selection line 113 is electrically connected to the gates of the selection transistors 106 of pixels of one row. The photodiode reset line 115 is a wiring to which a row photodiode reset pulse φRPDi used for resetting the photodiodes 101 of one row is applied. The photodiode reset line 115 is connected to the gates of the photodiode reset transistors 107 of one row. As described above, by employing the pixel configuration using five transistors, a photoelectric conversion function, a photodiode resetting function, an electric charge maintaining unit resetting function, an amplified reading function, a temporary memory function, and a selection function are implemented.

The MOS-type solid-state imaging device has a pixel array in which the pixels having the above-described configuration are arranged in a two-dimensional pattern of m rows×n columns. FIG. 10 shows the configuration of the solid-state imaging device. The solid-state imaging device shown in FIG. 10 is configured by a pixel unit 200, a vertical scanning circuit 300, a horizontal signal reading circuit 400, a current source 150, and various wirings.

The pixel unit 200 represents a structure in which the pixels 100 shown in FIG. 11 are arranged in a two-dimensional 3×3 pattern. The vertical scanning circuit 300 performs driving control of pixels in units of one row. In order to perform the driving control, the vertical scanning circuit 300 is configured by unit circuits 301-$i$ ($i$=1 to 3) that are disposed in correspondence with the number of the rows. The unit circuit 301-$i$ of each row is configured by control units 302-$i$, 303-$i$, 304-$i$, and 305-$i$.

The control unit 302-$i$ controls the floating diffusion reset pulse φRMi independently for each row. The control unit 303-$i$ controls the row transmission pulse φTRi independently for each row. The control unit 304-$i$ controls the photodiode reset pulse φRPDi independently for each row. In addition, the control unit 305-$i$ controls the row selection pulse φSEi independently for each row. The signals of pixels of the row selectively controlled in accordance with pulses are output to the vertical signal lines 114 that are disposed for each row.

The horizontal reading circuit 400 outputs the signals of pixels of one row that are output to the vertical signal lines 114 from the output terminal 410 in the alignment sequence of the horizontal direction in a time series. The current source 150 is connected to the vertical signal line 114 so as to provide a bias current. The floating diffusion reset line 111 is a wiring to which the floating diffusion reset pulse φRMi is applied. The transmission line 112 is a wiring to which the row transmission pulse φTRi is applied. In addition, the selection line 113 is a wiring to which the row selection pulse φSEi is applied. The photodiode reset line 115 is a wiring to which the photodiode reset pulse φRPDi is applied. Here, the pixel power source line 110 that supplies the pixel power source VDD is not shown in the figure.

A technique for reading out signals of all the pixels by reading out the signals of pixels of each row by sequentially selecting the first row to the m-th row under the above-described configuration is referred to as an ordinary XY address reading method. However, in the ordinary XY address reading method, the time at which the signal is accumulated is different for each row of the pixel array. Accordingly, the time for reading out a signal in the first row in which the signal is read out first and in the m-th row in which the signal is read out finally is different by a maximum of one frame. As a result, there is a problem in that an image is distorted in a case where an object moving at a high speed is photographed.

As a technique for solving the above-described problem, a global shutter reading method (for example, see Japanese Unexamined Patent Application, First Publications Nos. 2005-65184 and 2006-262070) is used. Hereinafter, the operation of the global shutter reading method will be described with reference to FIG. 12. First, the photodiode reset pulses φRPD1 to φRPDm of all the rows are set to a "Hi" level from the vertical scanning circuit 300. Accordingly, the photodiodes 101 of all the rows are in the reset state.

Subsequently, the floating diffusion reset pulse φRM1 of the first row is set to the "Hi" level, and thereby the electric charge maintaining units 103 of the first row are reset. Thereafter, the floating diffusion reset pulse φRM1 of the first row is set to a "Lo" level, and thereby the row transmission pulse φSE1 of the first row is set to the "Hi" level. Accordingly, a reset signal that is formed by a fixed pattern noise such as a reset noise and a variation of the threshold voltage of the source follower amplifier transistor is output through the vertical signal line 114 and the horizontal signal reading circuit 400. The output reset signal is stored in an external signal memory unit not shown in the figure. The above-described driving operation is performed sequentially for each row, and reset signals of all the rows are stored in the signal memory unit. Thereafter, the photodiode reset pulses φRPD1 to φRPDm are simultaneously set to the "Lo" level. Accordingly, accumulation of electric charges in pixels of all the rows is started at the same time.

After a predetermined period elapses, the floating diffusion reset pulses φRM1 to φRMm of all the rows are simultaneously set to the "Hi" level. Accordingly, the accumulation of electric charges in the pixels of all the rows is completed at the same time, and unnecessary electric charges of the signal electric charge maintaining unit 103 are discharged. Thereafter, the row transmission pulses φTR1 to φTRm of all the rows are set to the "Hi" level, and accordingly, the signal components (captured image signals) generated by the accumulation (exposure) for all the rows are transmitted altogether to the signal electric charge maintaining units 103.

Thereafter, the row selection pulses φSE1 to φSEm are set to the "Hi" level sequentially from the first row, and thereby captured image signals are output through the vertical signal line 114 and the horizontal signal reading circuit 400. By taking a difference between the output captured image signal component and the reset signal component stored in advance, only the captured image signal portion can be extracted by eliminating the reset noise and the fixed pattern noise. Therefore, an image having a high SN can be acquired.

By performing the above-described operation, the timings for the start and the end of accumulation of electric charges in the pixels of all the rows are the same. Accordingly, even in a case where a subject moves at a high speed, the subject is not captured in a distorted shape and a flicker of a fluorescent lamp does not appear in the image. Therefore, an image having a high image quality can be photographed.

In the related art, however, a driving method of sequential driving time (for example, an action mode) is not considered. FIG. 13 is a view showing a frame format of a concept in case that the driving shown in FIG. 12 is applied to sequential driving. In FIG. 13, the operation for one frame is configured by a sequential read-out operation 601 of reset signals, a batch accumulation starting operation 602, a batch transmission operation 603, and a sequential read-out operation 604 of captured image signals. A standby period 605 exists between a sequential read-out operation 604 of captured image signals and a sequential read-out operation 601 of reset signals of the next frame. In sequential driving, since the above-described standby period 605 arises, a speed-up of continuous shooting is hindered.

SUMMARY OF THE INVENTION

In one aspect of the present invention, there is provided a solid-state imaging device that includes at least: a pixel unit in which a plurality of photoelectric conversion devices, in which the amount of accumulated electric charges changes in accordance with incident light, are disposed two-dimensionally; an exposure control unit which controls the pixel unit such that the start and end of accumulation of electric charges are performed at the same time in the photoelectric conversion devices which belong to a plurality of rows included in the pixel unit; a first read-out path which reads out captured image signals of the photoelectric conversion devices in units of one row during a unit read-out period, a plurality of which is acquired by dividing a read-out period set between a first exposure period in which the captured image signals corresponding to a first frame are accumulated in the photoelectric conversion devices and a second exposure period in which the captured image signals corresponding to a second frame following the first frame are accumulated in the photoelectric conversion devices; and a second read-out path which reads out reset signals of the photoelectric conversion devices which belong to the same row as the row in which the captured image signals are read out during the unit read-out period.

Preferably, the first read-out path may include at least: a signal line which transmits the captured image signals of the photoelectric conversion devices during the unit read-out period; and a first output section which outputs the captured image signals transmitted through the signal line to the outside during the unit read-out period, and the second read-out path may include at least: a signal line, which is the same as the signal line, transmitting the reset signals of the photoelectric conversion devices after transmission of the captured image signals during the unit read-out period; and a second output section which outputs the reset signals transmitted through the signal line to the outside during the unit read-out period.

Preferably, the first read-out path may include at least: a first signal line which transmits the captured image signals of the photoelectric conversion devices during the unit read-out period; and a first output section which outputs the captured image signals transmitted through the first signal line to the outside during the unit read-out period, and the second read-out path may include at least: a second signal line which transmits the reset signals of the photoelectric conversion devices during the unit read-out period; and a second output section which outputs the reset signals transmitted through the second signal line to the outside during the unit read-out period.

Moreover, in another aspect of the present invention, there is provided a solid-state imaging device that includes at least: a pixel unit in which a plurality of photoelectric conversion devices, in which the amount of accumulated electric charges changes in accordance with incident light, are disposed two-dimensionally; an exposure control unit which controls the pixel unit such that the start and end of accumulation of electric charges are performed at the same time in the photoelectric conversion devices which belong to a plurality of rows included in the pixel unit; a first read-out path which reads out captured image signals of the photoelectric conversion devices which belong to a first row during a first unit read-out period, and reads out reset signals of the photoelectric conversion devices which belong to the first row during a second unit read-out period after the first unit read-out period, out of a plurality of the unit read-out periods acquired by dividing a read-out period set between a first exposure period in which the captured image signals corresponding to a first frame are accumulated in the photoelectric conversion devices and a second exposure period in which the captured image signals corresponding to a second frame following the first frame are accumulated in the photoelectric conversion devices; and a second read-out path which reads out the captured image signals of the photoelectric conversion devices which belong to a second row different from the first row during the second unit read-out period, and reads out the reset signals of the photoelectric conversion devices which belong to the second row during a third unit read-out period after the second unit read-out period.

In addition, in still another aspect of the present invention, there is provided a camera system that includes at least the above-described solid-state imaging device.

Moreover, in another aspect of the present invention, there is provided a signal reading method that includes at least: controlling a pixel unit such that the start and end of accumulation of electric charges are performed at the same time in photoelectric conversion devices which belong to a plurality of rows included in the pixel unit in which a plurality of photoelectric conversion devices, in which the amount of accumulated electric charges changes in accordance with incident light, are disposed two-dimensionally; reading out captured image signals of the photoelectric conversion devices in units of one row in a first read-out path during a unit read-out period, a plurality of which is acquired by dividing a read-out period set between a first exposure period in which the captured image signals corresponding to a first frame are accumulated in the photoelectric conversion devices and a second exposure period in which the captured image signals corresponding to a second frame following the first frame are accumulated in the photoelectric conversion devices; and reading out reset signals of the photoelectric conversion devices which belong to the same row as the row in which the captured image signals are read out, in a second read-out path different from the first read-out path, during the unit read-out period.

In addition, in still another aspect of the present invention, there is provided a signal reading method that includes at least: controlling a pixel unit such that the start and end of accumulation of electric charges are performed at the same time in photoelectric conversion devices which belong to a plurality of rows included in the pixel unit in which a plurality of photoelectric conversion devices, in which the amount of accumulated electric charges changes in accordance with incident light, are disposed two-dimensionally; reading out captured image signals of the photoelectric conversion devices which belong to a first row in a first read-out path during a first unit read-out period, out of a plurality of unit read-out periods acquired by dividing a read-out period set between a first exposure period in which the captured image signals corresponding to a first frame are accumulated in the photoelectric conversion devices and a second exposure period in which the captured image signals corresponding to a second frame following the first frame are accumulated in the photoelectric conversion devices; reading out reset signals of the photoelectric conversion devices which belong to the first row in the first read-out path during a second unit read-out period after the first unit read-out period, and reading out the captured image signals of the photoelectric conversion devices which belong to a second row different from the first row in a second read-out path different from the first read-out path; and reading out the reset signals of the photoelectric conversion devices which belong to the second row in the second read-out path during a third unit read-out period after the second unit read-out period.

BRIEF DESCRIPTION OF THE DRAWINGS

The above features and advantages of the present invention will be more apparent from the following detailed description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

For example, a solid-state imaging device according to each embodiment described below is assumed to have a pixel array of three rows and three columns or four rows and four columns. However, the number of pixels may be configured to be greater than that.

Hereinafter, embodiments of the present invention will be described with reference to the accompanying drawings.

First Embodiment

Figure 1:
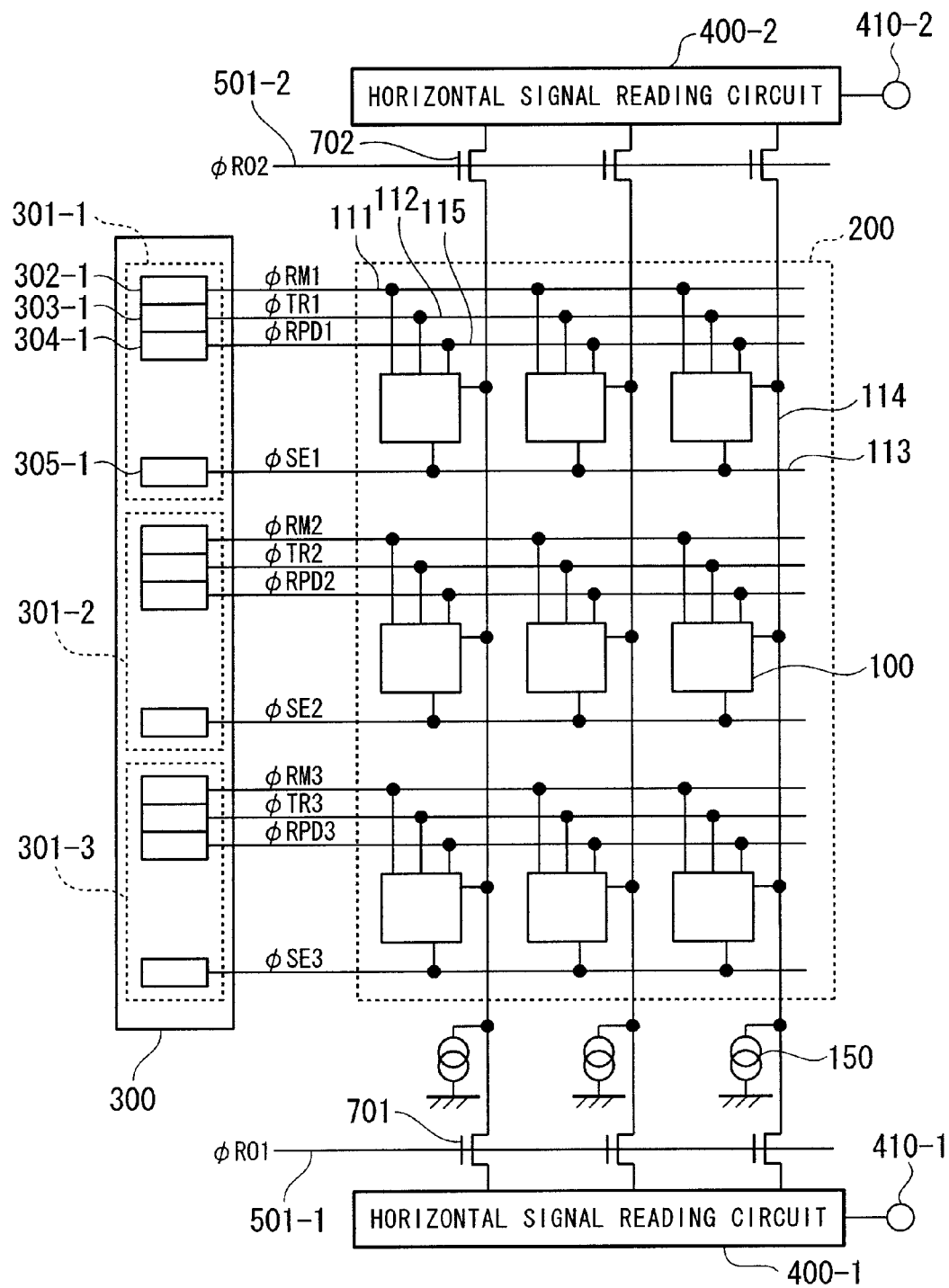
FIG. 1 is a block diagram showing the configuration of a solid-state imaging device according to a first embodiment of the present invention.

First, a first embodiment of the present invention will be described. FIG. 1 shows the configuration of a solid-state imaging device according to the first embodiment. The solid-state imaging device shown in FIG. 1 includes by a pixel unit 200, a vertical scanning circuit 300 (an exposure control unit), horizontal signal reading circuits 400-1 and 400-2, output selection transistors 701 and 702, a current source 150, and various wirings.

Figure 10:
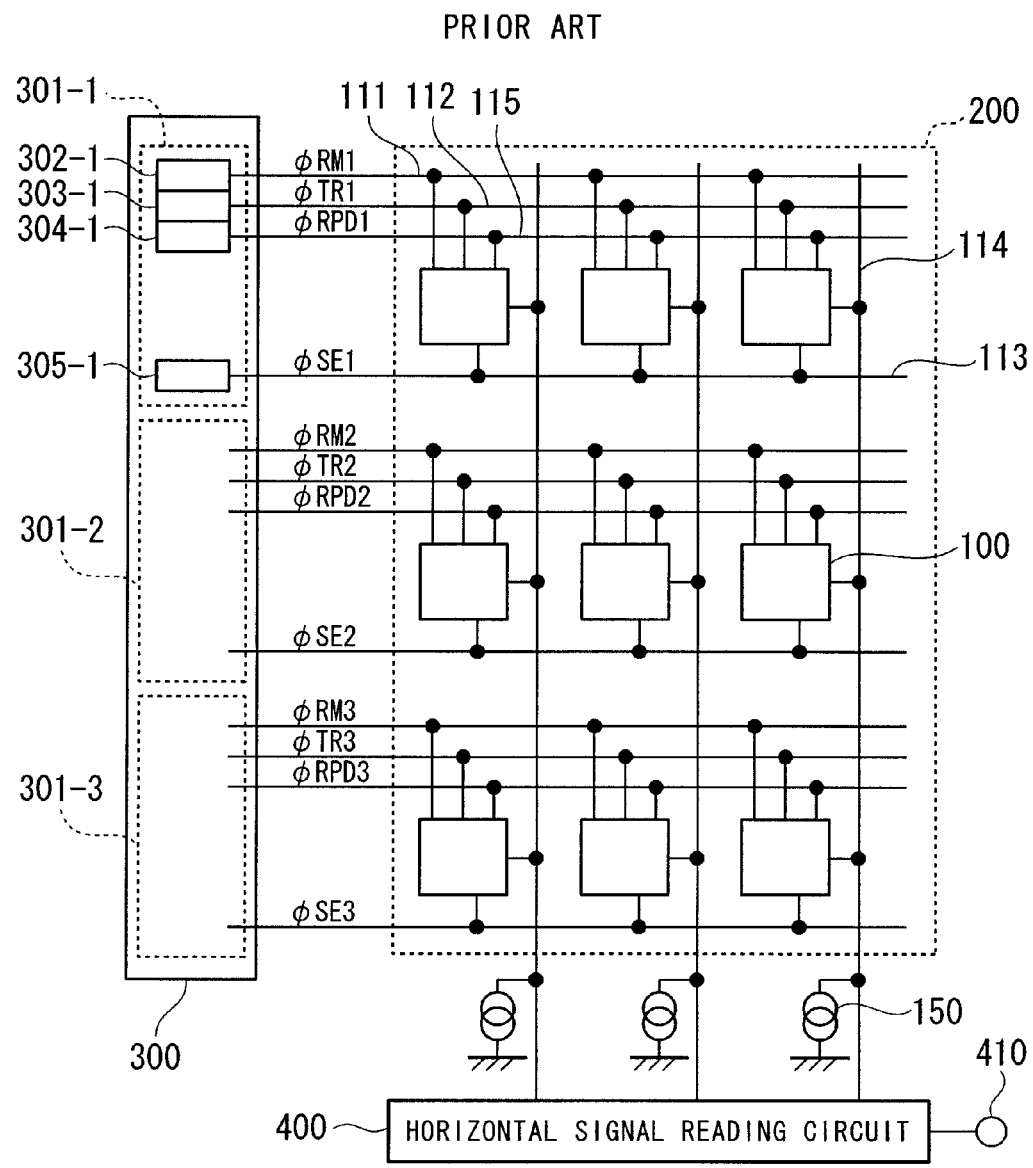
FIG. 10 is a block diagram showing the configuration of a solid-state imaging device.
Figure 11:
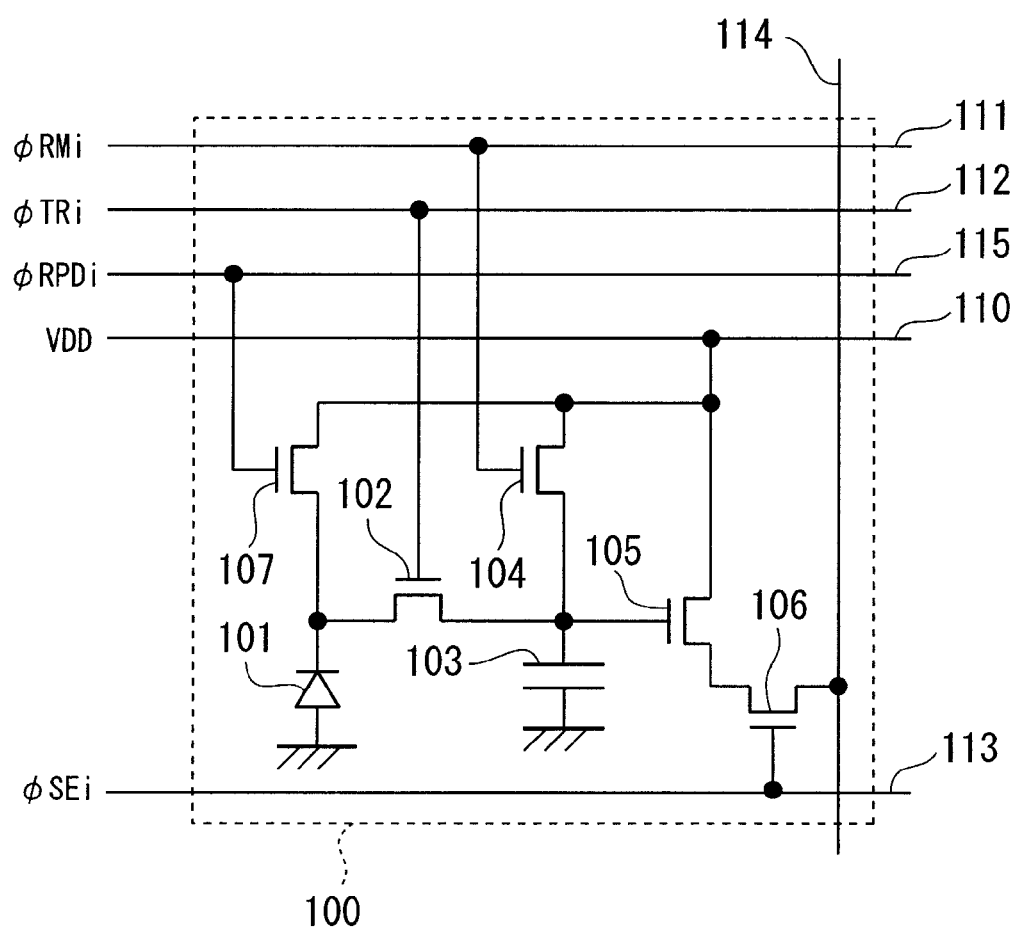
FIG. 11 is a circuit diagram showing the configuration of a pixel.

The configuration of pixels 100 within the pixel unit 200 is the same as those shown in FIGS. 10 and 11. The configuration of the horizontal signal reading circuits 400-1 and 400-2 is the same as that of the horizontal reading circuit 400 shown in FIG. 10. The output selection transistors 701 and 702 are transistors that are used for selecting a horizontal reading circuit, which outputs a signal output to the vertical signal line 114 to the outside, out of the two horizontal reading circuits 400-1 and 400-2. The output selection signal lines 501-1 and 501-2 are wirings to which pulses φRO1 and φRO2 used for controlling the output selection transistors 701 and 702 are applied. In addition, the output selection signal lines 501-1 and 501-2 are connected to the gates of the output selection transistors 701 and 702. The other configurations are the same as those shown in FIG. 10, and thus, description thereof is omitted.

The vertical signal line 114, the output selection transistor 701, and the horizontal signal reading circuit 400-1 (first output unit) form a first read-out path, and the vertical signal line 114, the output selection transistor 702, and the horizontal signal reading circuit 400-2 (second output unit) form a second read-out path. In the first embodiment, signals are read out from the pixel unit 200 through the two read-out paths during the same period in a parallel manner. This operation will be described later in detail.

Figure 2:
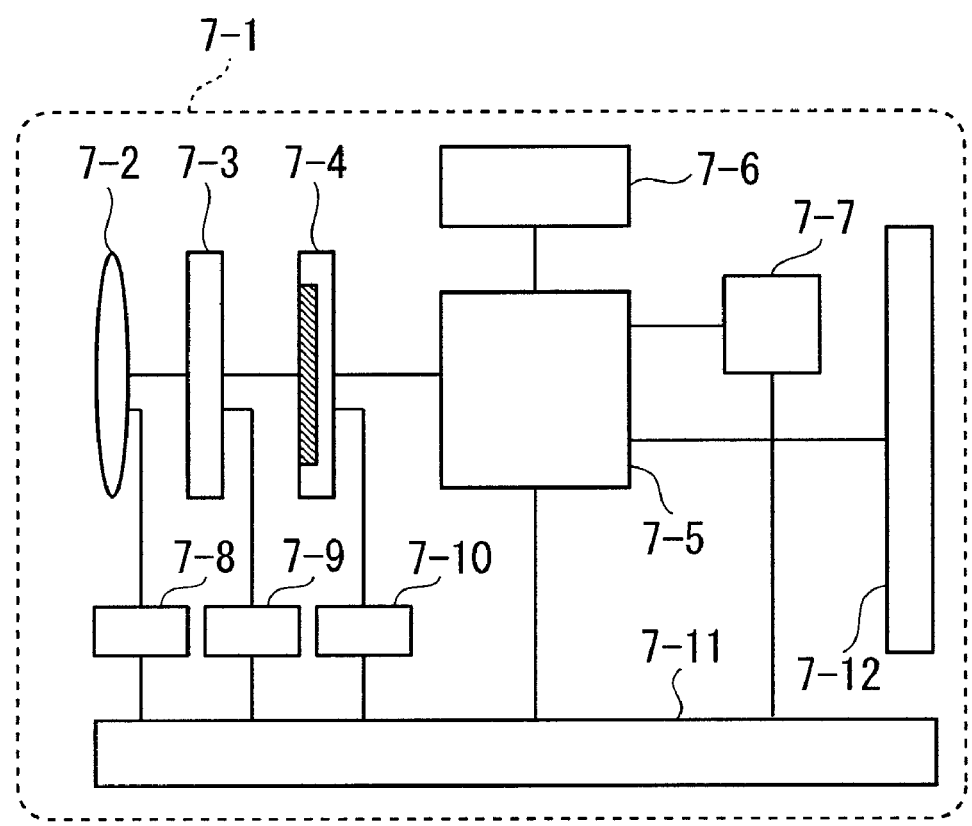
FIG. 2 is a block diagram showing a camera system according to the first embodiment of the present invention.

FIG. 2 shows the configuration of a digital camera (camera system) having the solid-state imaging device shown in FIG. 1. The digital camera 7-1 shown in FIG. 2 is configured by a lens 7-2, a mechanical shutter 7-3, an image sensor 7-4, an image processing circuit 7-5, a memory 7-6, a recording device 7-7, a lens control device 7-8, a shutter driving device 7-9, an image driving device 7-10, a camera control device 7-11, and a display device 7-12.

The lens 7-2 forms an image of a subject in the image sensor 7-4. The image sensor 7-4 is a solid-state imaging device shown in FIG. 1. The image processing circuit 7-5 performs various processes such as a correction process and a compression process for an image signal that is output from the image sensor 7-4. The memory 7-6 temporarily stores the image signal. The recording device 7-7 records the image signal that has been processed by the image processing circuit 7-5 on a recording medium. The lens control device 7-8 controls zooming, focusing, a diaphragm, and the like of the lens 7-2. The shutter driving device 7-9 controls driving of the mechanical shutter 7-3. The image driving device 7-10 controls driving of the image sensor 7-4. The camera control device 7-11 controls the overall operation of the digital camera 7-1. The display device 7-12 displays an image based on an image signal. The configuration of the digital camera 7-1 shown in FIG. 2 is the same in second and third embodiments to be described later.

Figure 3:
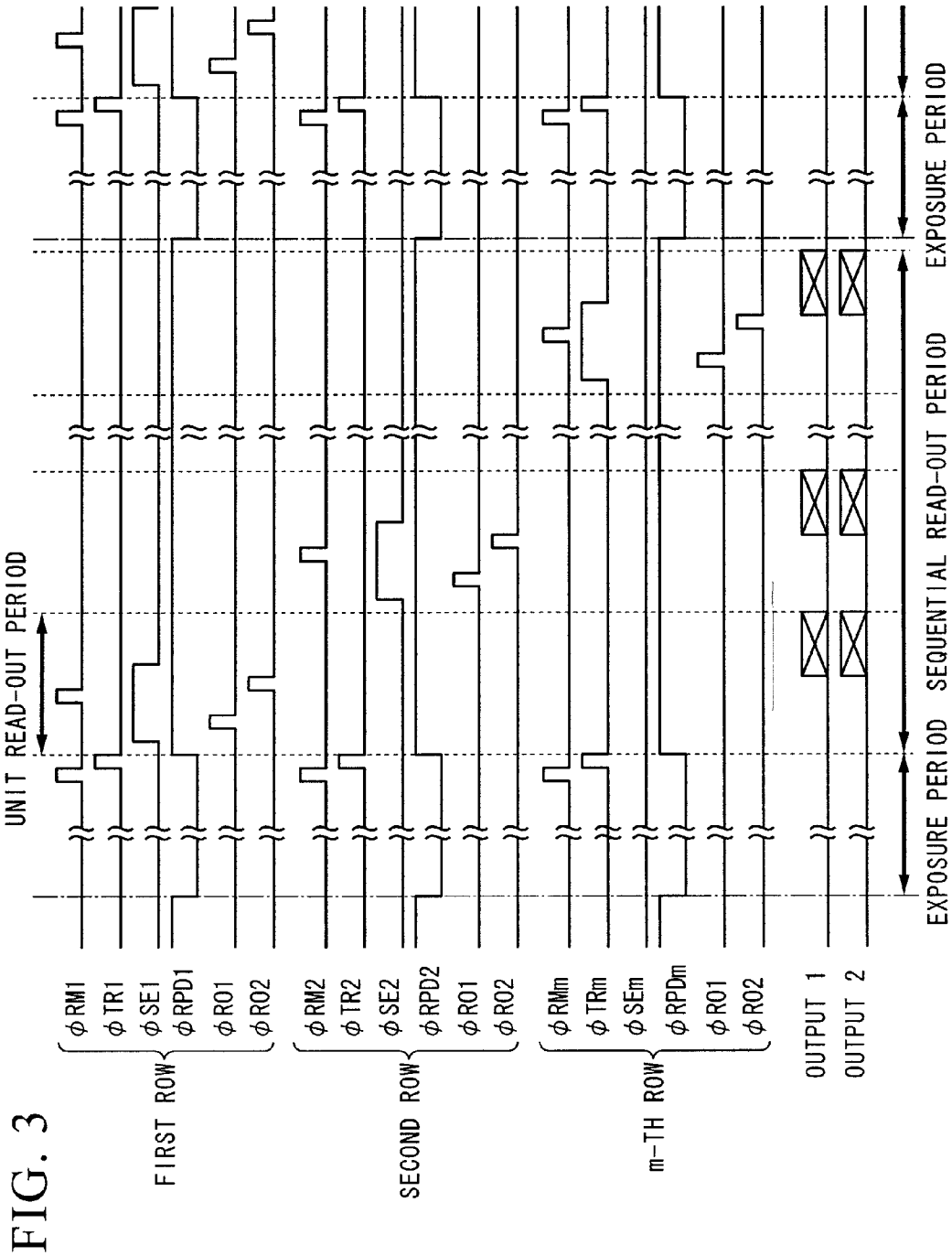
FIG. 3 is a timing chart representing driving timings of a solid-state imaging device according to the first embodiment of the present invention.
Figure 12:
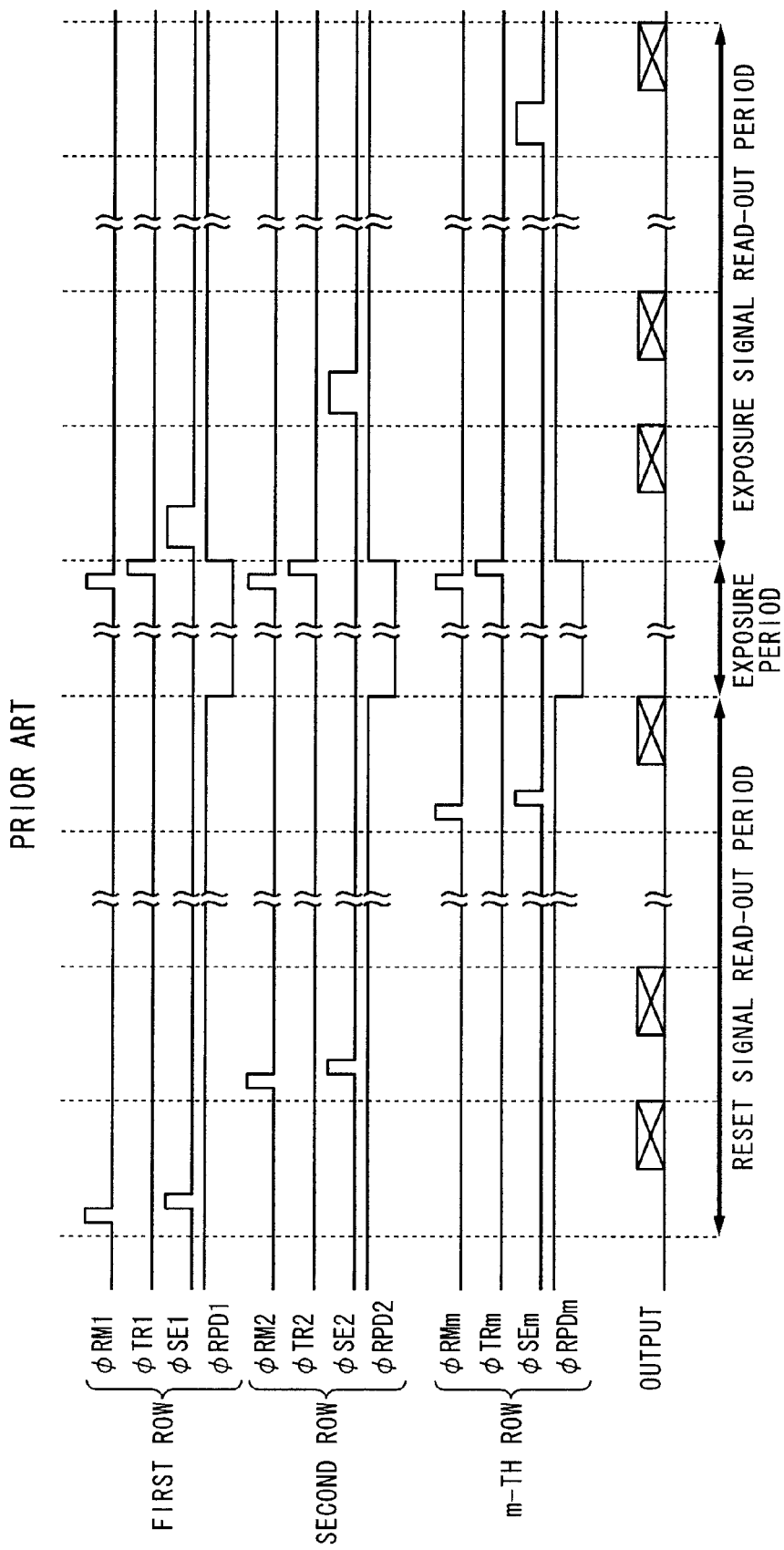
FIG. 12 is a timing chart representing the driving timings of a solid-state imaging device.
Figure 13:
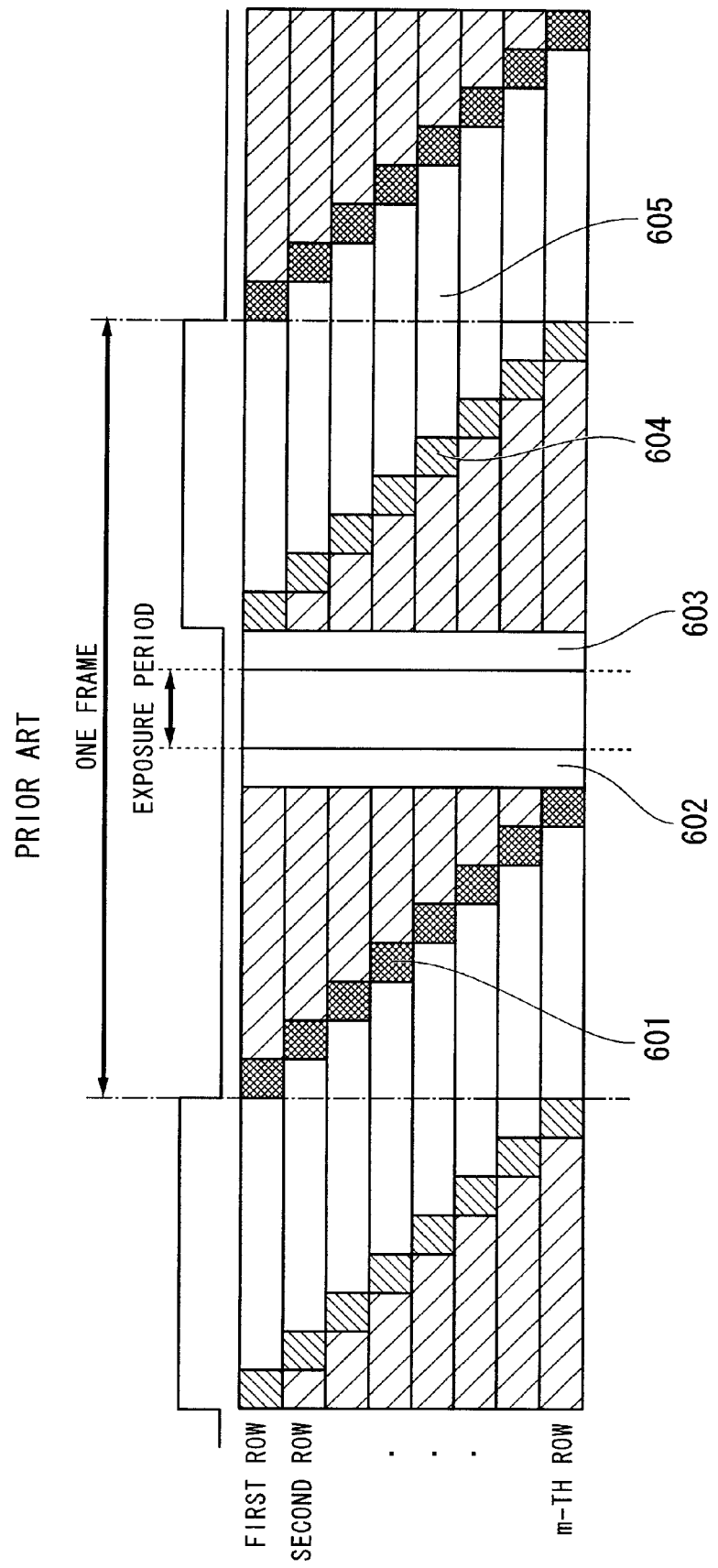
FIG. 13 is a schematic diagram showing the driving timings of a solid-state imaging device.

Hereinafter, a sequential driving sequence according to the first embodiment will be described with reference to FIG. 3. During a signal accumulation period (exposure period), electric charge according to incident light is accumulated in a photodiode 101. In addition, by supplying various pulses by using the vertical scanning circuit 300, a global shutter function in which the start and the end of accumulation of electric charges in all the pixels within the pixel unit 200 are simultaneously performed is implemented. The driving operation during the exposure period is the same as that shown in FIG. 12, and thus, description thereof is omitted here. The sequential read-out period disposed between consecutive frames is divided into a plurality of periods (unit read-out periods). In FIG. 3, the number of the unit read-out periods is the same as the number of rows.

During the unit read-out period after the end of the exposure period, first, a selection pulse φSE1 of the first row is set to a "Hi" level, and thereby the selection transistor 106 is in the ON state. Thereafter, during the unit read-out period the same as above, an output selection pulse φRO1 is set to the "Hi" level, and thereby the output selection transistor 701 is in the ON state. Accordingly, a signal (captured image signal) according to the electric charges accumulated in the photodiode 101 during the exposure period is output from an output terminal 410-1 through the vertical signal line 114, the output selection transistor 701, and the horizontal signal reading circuit 400-1.

Subsequently, during the same unit read-out period as above, the output selection pulse φRO1 is set to a "Lo" level, and thereby the output selection transistor 701 is in the OFF state. Thereafter, a floating diffusion reset pulse φRM1 is set to the "Hi" level, and thereby a floating diffusion reset transistor 104 is in the ON state. Accordingly, an electric charge maintaining unit 103 is reset.

Subsequently, during the same unit read-out period as above, the floating diffusion reset pulse φRM1 is set to the "Lo" level, and thereby the floating diffusion reset transistor 104 is in the OFF state. In addition, during the same unit read-out period as above, the output selection pulse φRO2 is set to the "Hi" level, and thereby the output selection transistor 702 is in the ON state. Accordingly, a signal (reset signal) of the reset level is output from the output terminal 410-2 through the vertical signal line 114, the output selection transistor 702, and the horizontal signal reading circuit 400-2. Thereafter, the output selection pulse φRO2 is set to the "Lo" level, and thereby the output selection transistor 702 is in the OFF state.

The driving of the first row is performed as described above. Each of the driving operations of the 2nd row to the m-th row is performed during a unit read-out period next to the unit read-out period during which the driving operation of the previous row is performed. By performing the driving operation sequentially up to the m-th row, a captured image signal component of each row is output from the output terminal 410-1, and a reset signal component of each row is output from the output terminal 410-2 in parallel with the output of the captured image signal component.

In FIG. 3, output 1 and output 2 are output at the same timing under the control of the horizontal signal reading circuits 400-1 and 400-2. On the contrary, the output 1 may be output before the output 2. In addition, the above-described driving operation can be implemented in a pixel structure without the photodiode reset transistor 107, that is, a pixel of a so-called four-transistor configuration.

Figure 9:
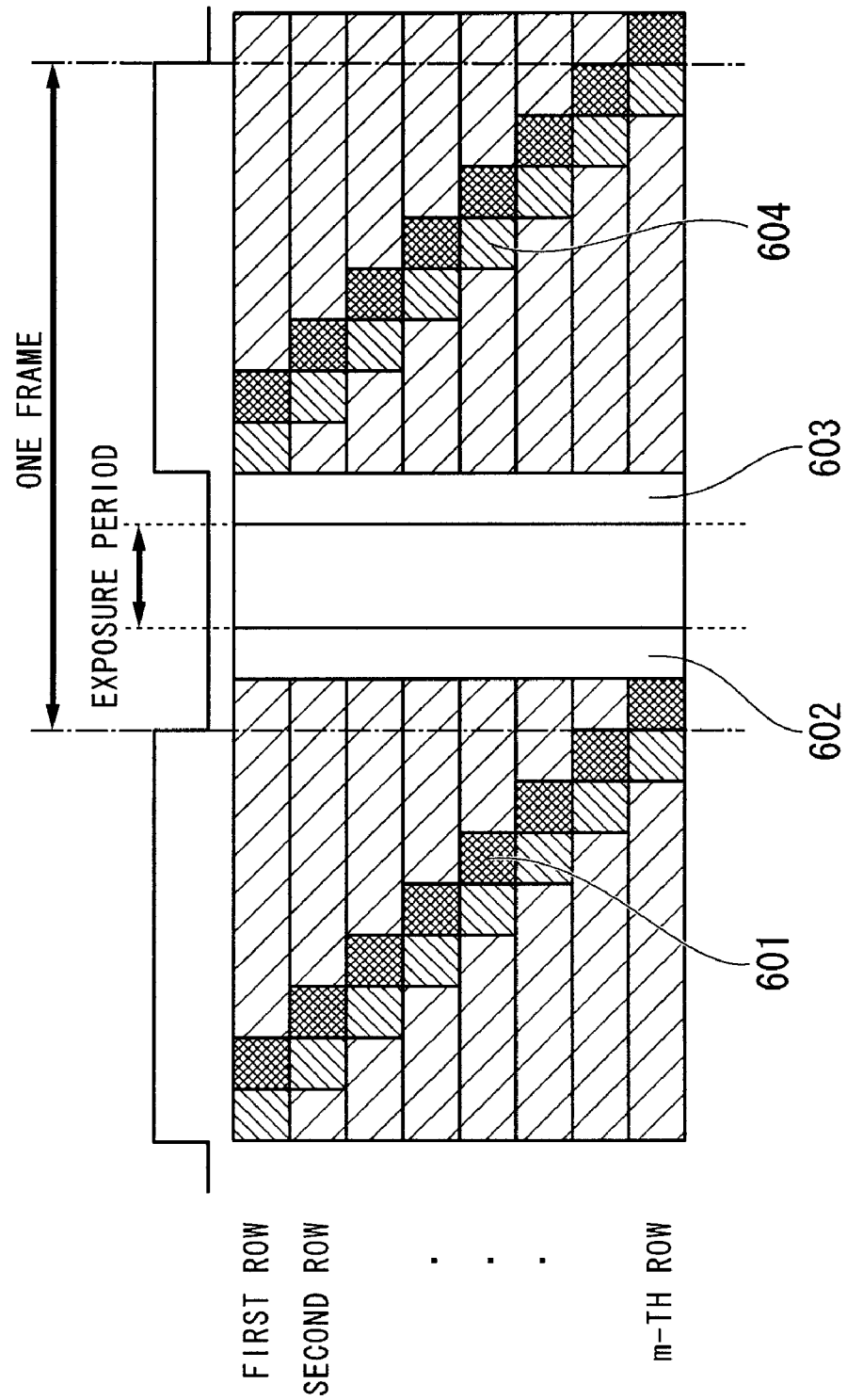
FIG. 9 is a schematic diagram showing the driving timings of solid-state imaging devices according to the embodiments of the present invention.

By performing the above-described driving operation, the captured image signal component of the current frame and the reset signal component of the next frame can be output in a parallel manner. FIG. 9 schematically shows the concept of a case where the driving operation shown in FIG. 3 is applied to sequential driving. In FIG. 9, the operation for one frame is configured by a sequential read-out operation 601 of reset signals, a batch accumulation starting operation 602, a batch transmission operation 603, and a sequential read-out operation 604 of captured image signals. According to the first embodiment, as shown in FIG. 9, a driving operation in which a standby period 605 does not exist between frames can be implemented. Therefore, the driving operation can be accelerated.

Second Embodiment

Figure 4:
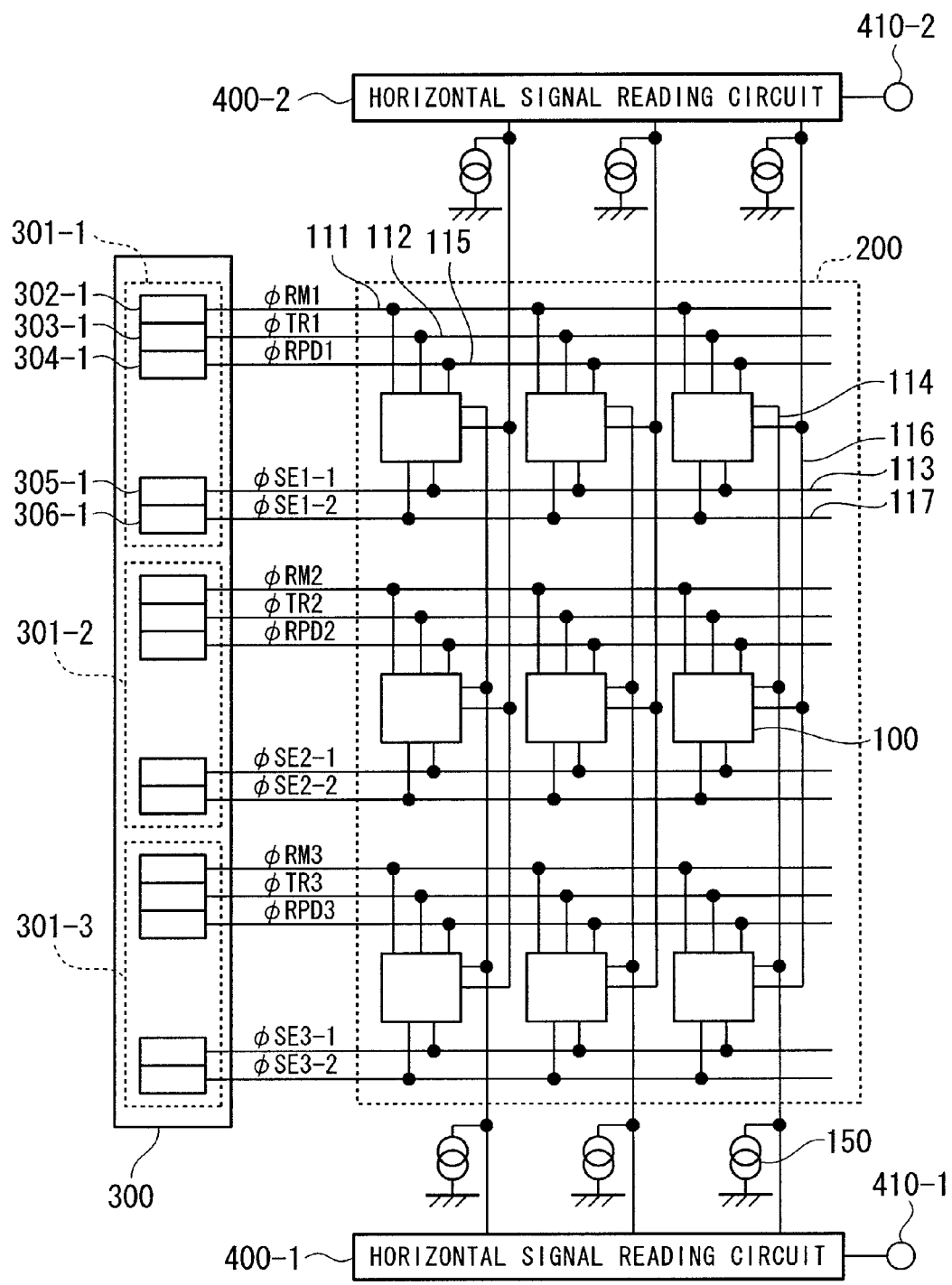
FIG. 4 is a block diagram showing the configuration of a solid-state imaging device according to a second embodiment of the present invention.

Next, a second embodiment of the present invention will be described. FIG. 4 shows the configuration of a solid-state imaging device according to the second embodiment. The solid-state imaging device shown in FIG. 4 is configured by a pixel unit 200, a vertical scanning circuit 300, horizontal signal reading circuits 400-1 and 400-2, a current source 150, and various wirings. In the solid-state imaging device shown in FIG. 4, the configurations of the pixels 100 and the vertical scanning circuit 300 are different from those of the solid-state imaging device shown in FIG. 10. The other configurations are the same as those shown in FIG. 10, and thus, description thereof is omitted here.

Figure 5:
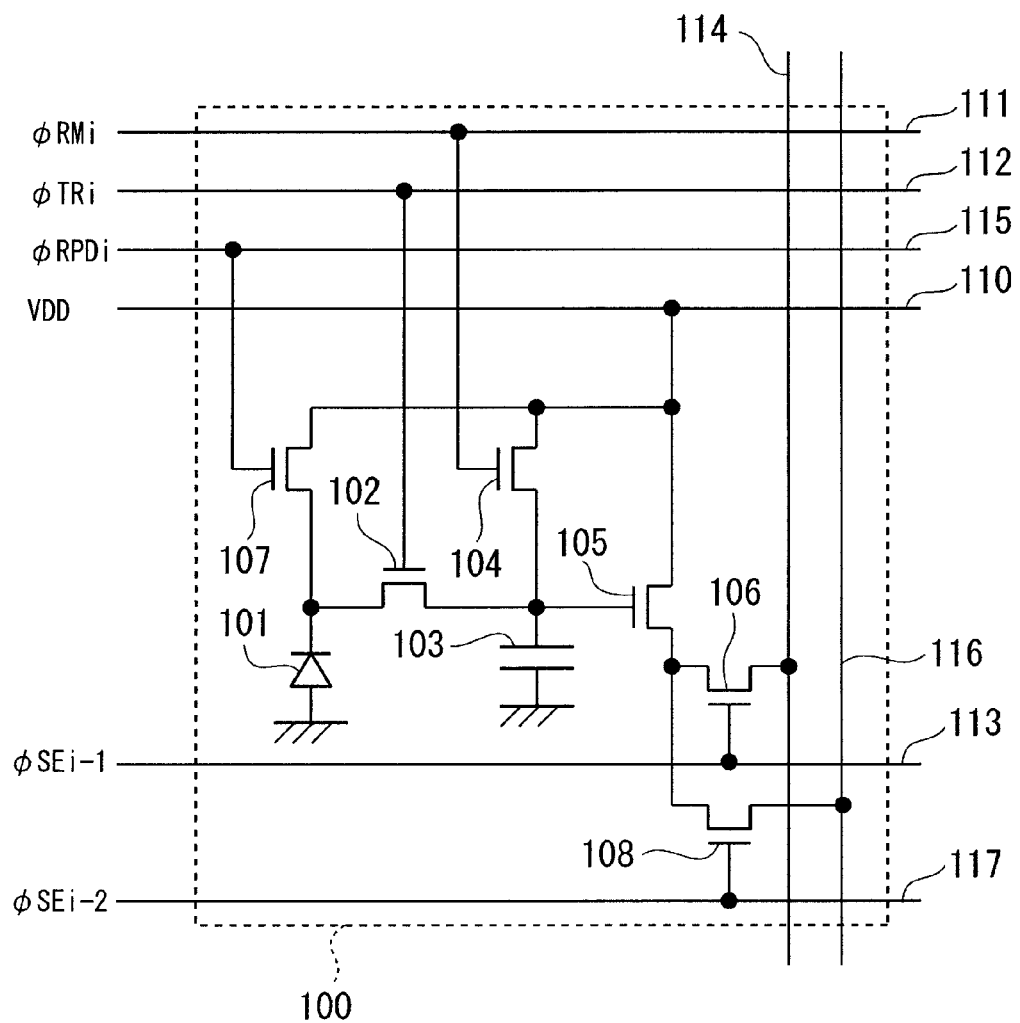
FIG. 5 is a circuit diagram showing the configuration of a pixel according to the second embodiment of the present invention.

FIG. 5 shows the configuration of the pixel 100. The pixel 100 shown in FIG. 5 is different from the pixel 100 shown in FIG. 11 in that a selection transistor 108, a vertical signal line 116, and a selection line 117 are additionally included. The selection transistor 108 is a transistor that is used for selecting a pixel so as to transmit the output of the amplifier transistor 105 to the vertical signal line 116. In addition, the selection line 117 is a wiring to which a row selection pulse φSEi-2 used for selecting pixels of one row is applied. The selection line 117 is electrically connected to the gates of the selection transistors 108 of the pixels of one row. The other configurations are the same as those shown in FIG. 11, and thus, description thereof is omitted here. However, a row selection pulse φSEi-1 is applied to the selection line 113.

In addition, in the vertical scanning circuit 300, control units 306-i (i=1 to 3) are additionally included. The control unit 306-i controls the row selection pulses φSEi-2 independently for each row. The other configurations are the same as those shown in FIG. 10, and thus, description thereof is omitted here. On the other hand, the control unit 305-i controls the row selection pulse φSEi-1 independently for each row.

The vertical signal line 114 (first signal line) and the horizontal signal reading circuit 400-1 (first output unit) form a first read-out path, and the vertical signal line 116 (second signal line) and the horizontal signal reading circuit 400-2 (second output unit) form a second read-out path. In the second embodiment, signals are read out from the pixel unit 200 through the two read-out paths during the same period in a parallel manner. This operation will be described later in detail.

Figure 6:
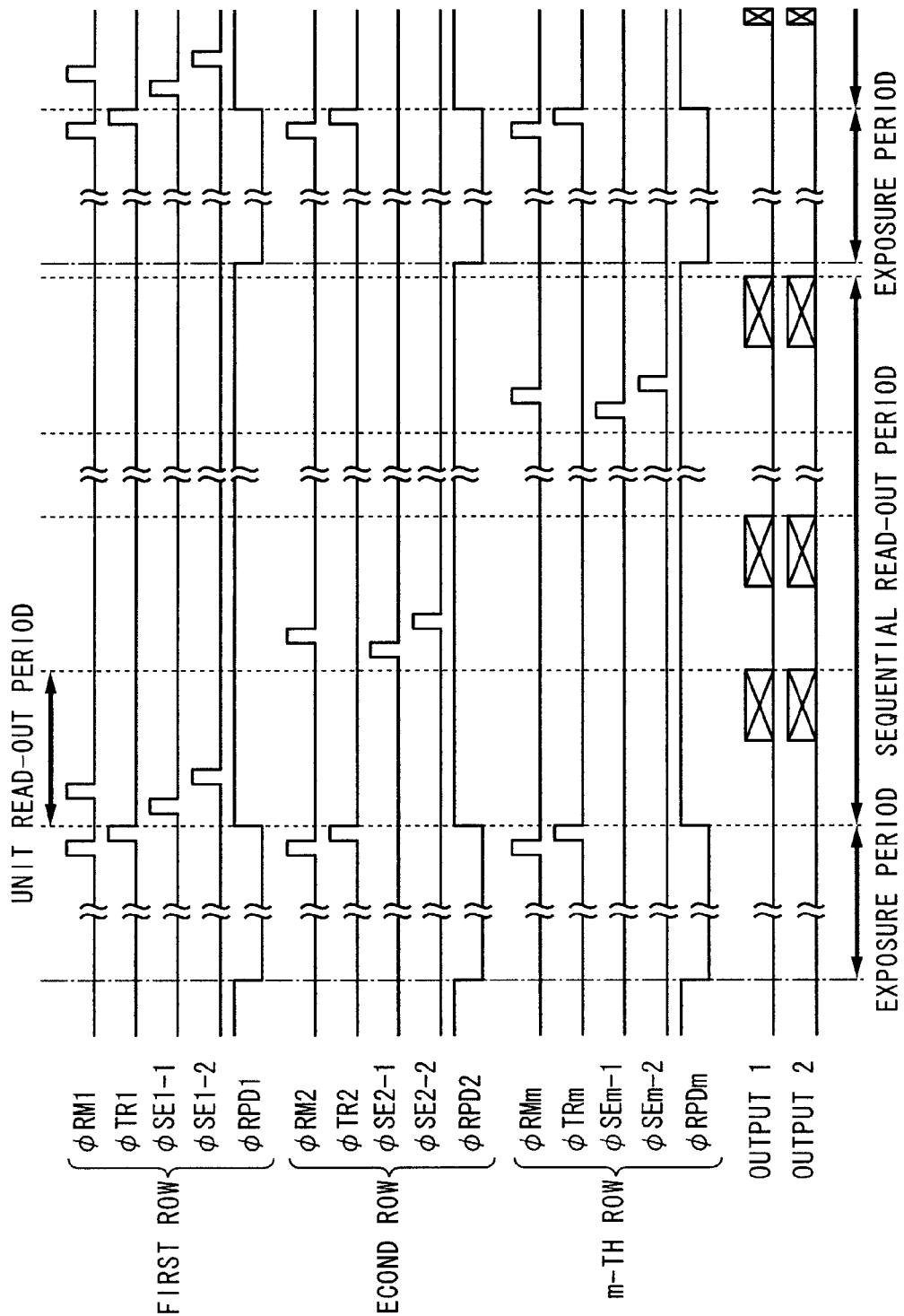
FIG. 6 is a timing chart representing driving timings of a solid-state imaging device according to the second embodiment of the present invention.

Hereinafter, a sequential driving sequence according to the second embodiment will be described with reference to FIG. 6. The driving operation during the exposure period is the same as the driving operation shown in FIG. 12, and thus, description thereof is omitted here. The sequential read-out period disposed between consecutive frames is divided into a plurality of periods (unit read-out periods). In FIG. 6, the number of the unit read-out periods is the same as the number of rows.

During the unit read-out period after the end of the exposure period, first, a selection pulse φSE1-1 of the first row is set to the "Hi" level, and thereby the selection transistor 106 is in the ON state. Accordingly, a signal (captured image signal) according to the electric charges accumulated during the exposure period is output from the output terminal 410-1 through the vertical signal line 114 and the horizontal signal reading circuit 400-1.

Subsequently, during the unit read-out period same as above, the selection pulse φSE1-1 is set to the "Lo" level, and thereby the selection transistor 106 is in the OFF state. Thereafter, the floating diffusion reset pulse φRM1 is set to the "Hi" level, and thereby the floating diffusion reset transistor 104 is in the ON state. Accordingly, the electric charge maintaining unit 103 is reset.

Subsequently, during the unit read-out period same as above, the floating diffusion reset pulse φRM1 is set to the "Lo" level, and thereby the floating diffusion reset transistor 104 is in the OFF state. In addition, during the unit read-out period same as above, the selection pulse φSE1-2 is set to the "Hi" level, and thereby the selection transistor 108 is in the ON state. Accordingly, a signal (reset signal) of the reset level is output from the output terminal 410-2 through the vertical signal line 116 and the horizontal signal reading circuit 400-2. Thereafter, the selection pulse φSE1-2 is set to the "Lo" level, and thereby the selection transistor 108 is in the OFF state.

The driving of the first row is performed as described above. Each of the driving operations of the 2nd row to the m-th row is performed during a unit read-out period next to the unit read-out period during which the driving operation of the previous row is performed. By performing the driving operation sequentially up to the m-th row, a captured image signal component of each row is output from the output terminal 410-1, and a reset signal component of each row is output from the output terminal 410-2 in parallel with the output of the captured image signal component.

In FIG. 6, output 1 and output 2 are output at the same time under the control of the horizontal signal reading circuits 400-1 and 400-2. On the contrary, the output 1 may be output before the output 2. In addition, the above-described driving operation can be implemented in a pixel structure without the photodiode reset transistor 107, that is, a pixel of a so-called four-transistor configuration.

By performing the above-described driving operation, the captured image signal component of the current frame and the reset signal component of the next frame can be output in a parallel manner. According to the second embodiment, as shown in FIG. 9, a driving operation in which a standby period 605 does not exist between frames can be implemented. Therefore, the driving operation can be accelerated.

In the first embodiment, in order to transfer a captured image signal and a reset signal of the same row to the horizontal reading circuits 400-1 and 400-2 through the same vertical signal line 114 during the same unit read-out period, switching between the read-out paths needs to be performed by the output selection transistors 701 and 702. On the other hand, in the second embodiment, two vertical signal lines 114 and 116 are disposed, and switching between the read-out paths is not needed to transfer a captured image signal and a reset signal of the same row to the horizontal reading circuits 400-1 and 400-2 through the vertical signal lines 114 and 116 during the same unit read-out period.

Accordingly, in the second embodiment, a time needed for switching between the read-out paths can be curtailed, compared to the first embodiment. In addition, in the second embodiment, two vertical signal lines 114 and 116 are disposed, and accordingly, the wiring within the pixel 100 is complicated, compared to the first embodiment.

Third Embodiment

Figure 7:
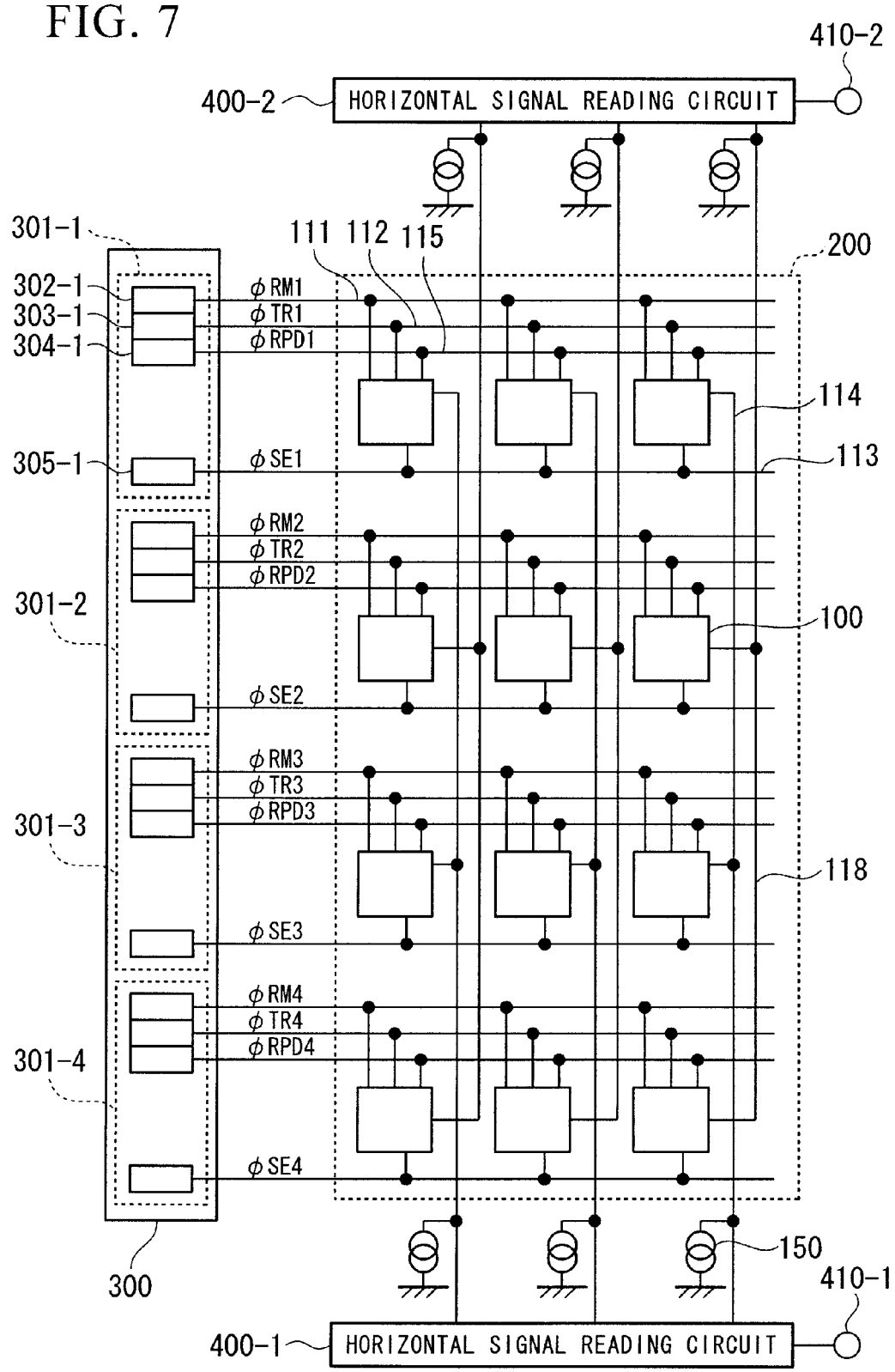
FIG. 7 is a block diagram showing the configuration of a solid-state imaging device according to a third embodiment of the present invention.

Next, a third embodiment of the present invention will be described. FIG. 7 shows the configuration of a solid-state imaging device according to the third embodiment. The solid-state imaging device shown in FIG. 7 includes a pixel unit 200, a vertical scanning circuit 300, horizontal signal reading circuits 400-1 and 400-2, a current source 150, and various wirings. In the solid-state imaging device shown in FIG. 7, the configuration is different from that of the solid-state imaging device shown in FIG. 10 in that a vertical signal line 118 is additionally included. In addition, the vertical signal line 114 is connected to the pixels 100 of odd rows, and the vertical signal line 118 is connected to pixels 100 of even rows. The other configurations are the same as those shown in FIG. 10, and thus, description thereof is omitted here.

The vertical signal line 114 and the horizontal signal reading circuit 400-1 configure a first read-out path, and the vertical signal line 118 and the horizontal signal reading circuit 400-2 form a second read-out path. In the third embodiment, signals are read out from the pixel unit 200 through the two read-out paths during the same period in a parallel manner. This operation will be described later in detail.

Figure 8:
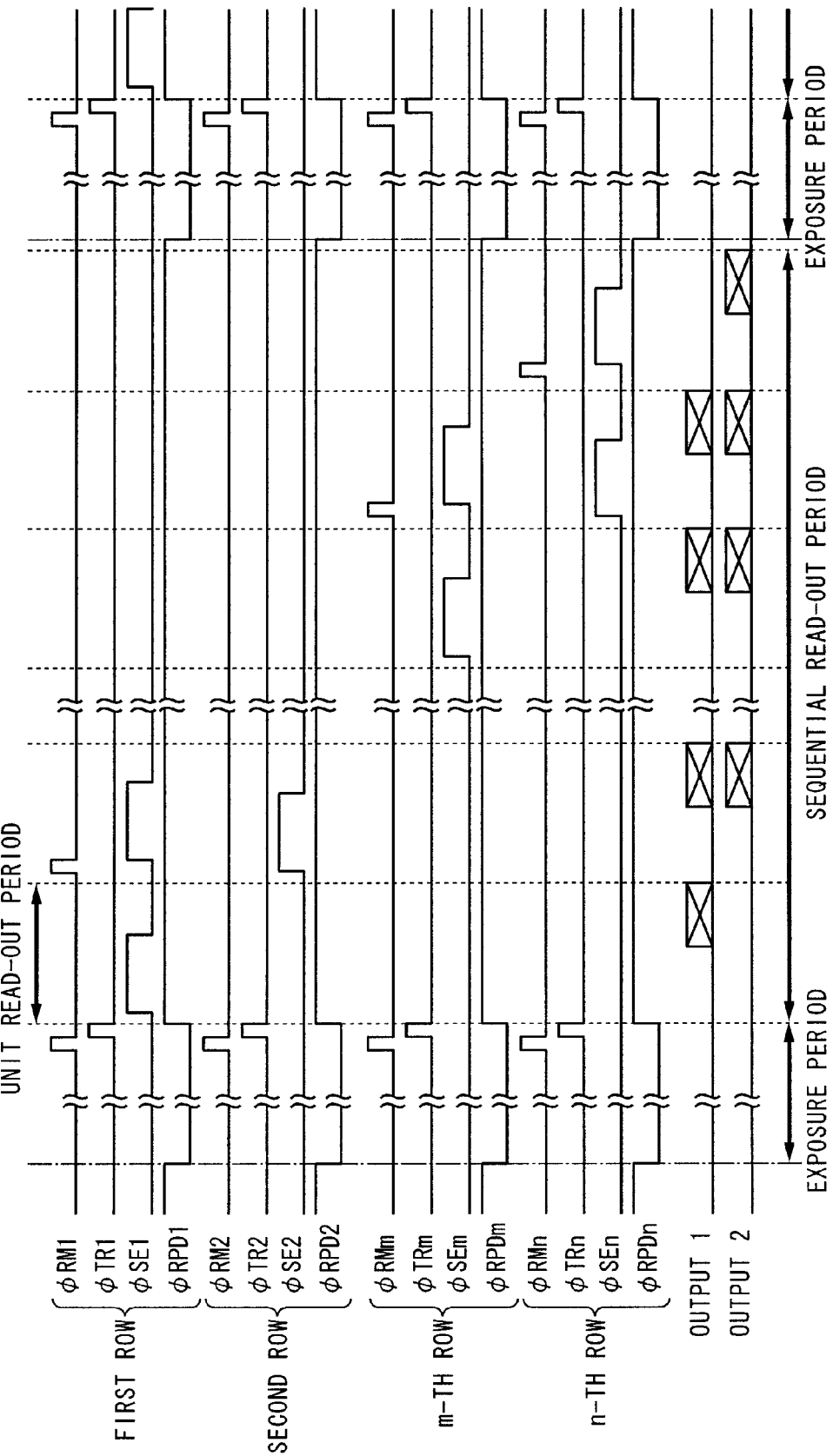
FIG. 8 is a timing chart representing driving timings of a solid-state imaging device according to the third embodiment of the present invention.

Hereinafter, a sequential driving sequence according to the third embodiment will be described with reference to FIG. 8. The driving operation during the exposure period is the same as the driving operation shown in FIG. 12, and thus, description thereof is omitted here. The sequential read-out period disposed between consecutive frames is divided into a plurality of periods (unit read-out periods). In FIG. 8, the number of the unit read-out periods is greater by one than the number of rows.

During a unit read-out period (a first unit read-out period) after the end of the exposure period, first, the selection pulse φSE1 of the first row is set to the "Hi" level, and thereby the selection transistor 106 is in the ON state. Accordingly, a signal (captured image signal) according to the electric charges accumulated in the photodiode 101 of the first row during the exposure period is output from the output terminal 410-1 through the vertical signal line 114 and the horizontal signal reading circuit 400-1. Subsequently, during the unit read-out period same as above, the selection pulse φSE1 is set to the "Lo" level, and thereby the selection transistor 106 is in the OFF state.

Subsequently, during a unit read-out period (second unit read-out period) next to the first unit read-out period, the floating diffusion reset pulse φRM1 is set to the "Hi" level, and thereby the floating diffusion reset transistor 104 is in the ON state. Accordingly, the electric charge maintaining unit 103 is reset.

Subsequently, during the second unit read-out period, the selection pulse φSE1 of the first row is set to the "Hi" level again, and thereby the selection transistor 106 is in the ON state again. Accordingly, a signal (reset signal) of the reset level is output from the output terminal 410-1 through the vertical signal line 114 and the horizontal signal reading circuit 400-1. Thereafter, the selection pulse φSE1 is set to the "Lo" level, and thereby the selection transistor 106 is in the OFF state.

In addition, during the second unit read-out period, the selection pulse φSE2 of the second row is set to the "Hi" level, and thereby the selection transistor 106 is in the ON state. Accordingly, a captured image signal according to the electric charges accumulated in the photodiode 101 of the second row during the exposure period is output from the output terminal 410-2 through the vertical signal line 118 and the horizontal signal reading circuit 400-2. Thereafter, the selection pulse φSE2 is set to the "Lo" level, and thereby the selection transistor 106 is in the OFF state.

During a unit read-out period (third unit read-out period) next to the second unit read-out period, for the second row, a driving operation that is the same as the driving operation for the first row during the second unit read-out period is performed. Accordingly, a reset signal of the second row is output from the output terminal 410-2 through the vertical signal line 114 and the horizontal signal reading circuit 400-2. In addition, during the third unit read-out period, for the third row, a driving operation that is the same as the driving operation for the first row during the first unit read-out period is performed. Accordingly, a captured image signal of the third row is output from the output terminal 410-1 through the vertical signal line 114 and the horizontal signal reading circuit 400-1.

By performing the above-described driving operation sequentially up to the m-th row, a captured image signal component and a reset signal component of odd rows are output from the output terminal 410-1, and a captured image signal component and a reset signal component of even rows are output from the output terminal 410-2.

In FIG. 6, output 1 and output 2 are output at the same, time under the control of the horizontal signal reading circuits 400-1 and 400-2. On the contrary, the output 1 may be output before the output 2. In addition, the above-described driving operation can be implemented in a pixel structure without the photodiode reset transistor 107, that is, a pixel of a so-called four-transistor configuration.

In the above-described driving method, in order to acquire a reset signal of the last row, a unit read-out period for one line is additionally needed, compared to the first embodiment or the second embodiment. However, the configuration in which the captured image signal component of the current frame and the reset signal component of the next frame are output in a parallel manner is the same. Therefore, according to the third embodiment, as shown in FIG. 9, a driving operation in which a standby period 605 does not exist between frames can be implemented. Therefore, the driving operation can be accelerated.

As described above, switching between the read-out paths needs to be performed in the first embodiment. However, in the third embodiment, switching between the read-out paths is not needed, similarly to the second embodiment. Therefore, according to the third embodiment, a time needed for switching between the read-out paths can be curtailed, compared to the first embodiment. However, as described above, in the third embodiment, a unit read-out period for one line is additionally needed. On the other hand, in the third embodiment, two vertical signal lines 114 and 118 are disposed, and accordingly, the wiring within the pixel 100 is complicated, compared to the first embodiment.

In addition, although the vertical signal lines 114 and 116 are connected to the pixels 100 of all the rows in the second embodiment, in the third embodiment, the vertical signal line 114 is connected to the pixels 100 of odd rows, and the vertical signal line 118 is connected to the pixels 100 of even rows. Therefore, according to the third embodiment, the amount of wiring within the pixel 100 can be reduced, compared to the second embodiment.

In other words, according to an embodiment of the present invention, by reading out the captured image signal of the photoelectric conversion device and the reset signal from different read-outs paths during the same unit read-out period, the standby time for sequential driving is reduced. Therefore, the driving operation can be accelerated.

While the exemplary embodiments of the invention have been described with reference to the accompanying drawings, the detailed constitutions of the invention are not limited to the foregoing embodiments but embrace changes in design to the extent that they do not depart from the concept of the invention.

What is claimed is:
1. A solid-state imaging device comprising:
   a pixel unit in which a plurality of photoelectric conversion devices, in which the amount of accumulated electric charges changes in accordance with incident light, are disposed two-dimensionally;
   an exposure control unit which controls the pixel unit such that the start and end of accumulation of electric charges are performed at the same time in the photoelectric conversion devices which belong to a plurality of rows included in the pixel unit;
   a first read-out path which reads out captured image signals of the photoelectric conversion devices in units of one row during a unit read-out period, a plurality of which is acquired by dividing a read-out period set between a first exposure period in which the captured image signals corresponding to a first frame are accumulated in the photoelectric conversion devices and a second exposure period in which the captured image signals corresponding to a second frame following the first frame are accumulated in the photoelectric conversion devices; and a second read-out path which reads out reset signals of the photoelectric conversion devices which belong to the same row as the row in which the captured image signals are read out during the unit read-out period.

2. The solid-state imaging device according to claim 1, wherein the first read-out path comprises:
  a signal line which transmits the captured image signals of the photoelectric conversion devices during the unit read-out period; and
  a first output section which outputs the captured image signals transmitted through the signal line to the outside during the unit read-out period and the second read-out path comprises:
  a signal line, which is the same as the signal line, transmitting the reset signals of the photoelectric conversion devices after transmission of the captured image signals during the unit read-out period; and
  a second output section which outputs the reset signals transmitted through the signal line to the outside during the unit read-out period.

3. The solid-state imaging device according to claim 1, wherein the first read-out path comprises:
  a first signal line which transmits the captured image signals of the photoelectric conversion devices during the unit read-out period; and
  a first output section which outputs the captured image signals transmitted through the first signal line to the outside during the unit read-out period and the second read-out path comprises:
  a second signal line which transmits the reset signals of the photoelectric conversion devices during the unit read-out period; and
  a second output section which outputs the reset signals transmitted through the second signal line to the outside during the unit read-out period.

4. A camera system comprising the solid-state imaging device according to claim 1.

5. A signal reading method comprising:
  controlling a pixel unit such that the start and end of accumulation of electric charges are performed at the same time in photoelectric conversion devices which belong to a plurality of rows included in the pixel unit in which a plurality of photoelectric conversion devices, in which the amount of accumulated electric charges changes in accordance with incident light, are disposed two-dimensionally;
  reading out captured image signals of the photoelectric conversion devices in units of one row in a first read-out path during a unit read-out period, a plurality of which is acquired by dividing a read-out period set between a first exposure period in which the captured image signals corresponding to a first frame are accumulated in the photoelectric conversion devices and a second exposure period in which the captured image signals corresponding to a second frame following the first frame are accumulated in the photoelectric conversion devices; and
  reading out reset signals of the photoelectric conversion devices which belong to the same row as the row in which the captured image signals are read out, in a second read-out path different from the first read-out path, during the unit read-out period.

* * * * *